G. A. CROSMAN.
SLEIGH.
No. 175,824. Patented April 11, 1876.
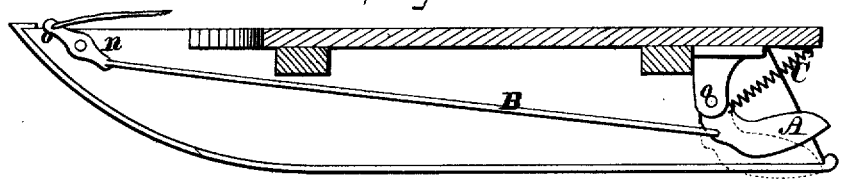
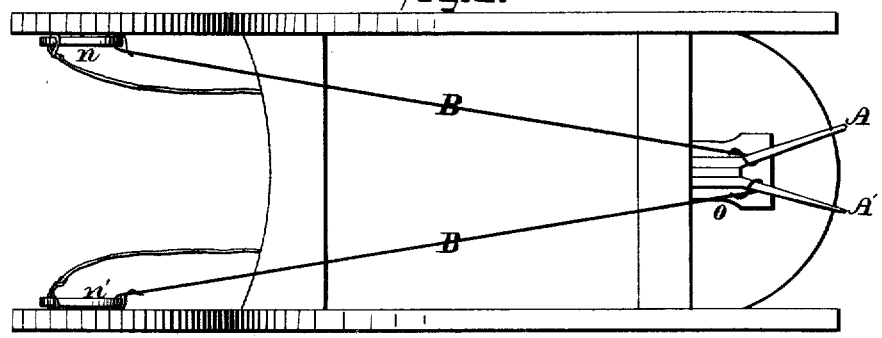
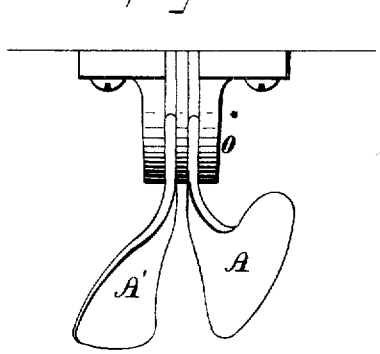
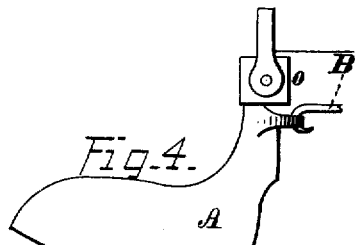
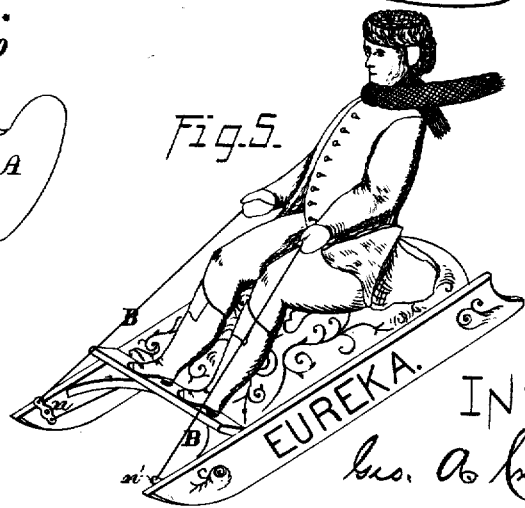
WITNESSES:
Jas. E. Hutchinson
John R. Young
INVENTOR.
Geo. A. Crosman by
Prindle and Co, his Attys

UNITED STATES PATENT OFFICE.

GEORGE A. CROSMAN, OF SWAMPSCOTT, MASSACHUSETTS.

IMPROVEMENT IN SLEIGHS.

Specification forming part of Letters Patent No. 175,824, dated April 11, 1876; application filed March 31, 1875.

*To all whom it may concern:*

Be it known that I, G. A. CROSMAN, of Swampscott, Massachusetts, have invented an Improvement in Combined Steering and Braking Apparatus for Sleds, of which the following is a specification:

This invention consists of a device for steering sleds, which can also be operated as a brake in stopping the same, and is constructed with two leaves shaped much like the mold-board of an ordinary plow, independently hinged to a suitable frame-work screwed to the cross-bar of the sled and used singly to guide the sled, and jointly as a brake or drag. These leaves are shaped to diverge diagonally in opposite directions from the hinge toward the ends of the runners of the sled, and are kept from the track in a position to be readily applied by springs attaching them to the under part of the sled-seat. Two rods connect the shares with a lever operated by the draft-rope of the sled.

I will explain my invention with the aid of the accompanying drawing, forming a part of this specification.

Figure 1 is a longitudinal section of a sled, showing the arrangement of the steering apparatus when inactive. Fig. 2 is a plan of the same. Fig. 3 shows the two leaves of the steering device. Fig. 4 shows the method of hinging the leaves to the frame-work attached to the cross-bar of a sled, also the connecting-rods and the conformation of the leaves on the bottom. Fig. 5 shows the method of its active application.

Like letters indicate like parts in the drawing.

A and A' are the leaves hinged at $o$, as shown in Fig. 1. B and B are rods, attached to the leaves in such a way that a forward movement of the rods will draw the leaves to the track, and secured to and operated by levers $n$ $n'$, which are pivoted to the runners of the sled, and also serve to hold the draft-rope. Springs C serve to lift the leaves.

I claim and desire to secure by Letters Patent of the United States—

1. In combination with a sled, the leaves A and A', hinged or pivoted to or upon the lower side, near the rear end of the same, to have independent vertical motion, and relatively arranged upon rearward and outward diverging lines, substantially as and for the purpose specified.

2. In combination with the leaves A and A', hinged or pivoted upon the lower side, near the rear end of a sled, the springs C, the pivoted bars $n$ and $n'$, and the rods B and B, all constructed and arranged to operate substantially as and for the purpose shown.

G. A. CROSMAN.

Witnesses:
WM. L. TEAL,
F. F. RAYMOND.